(12) United States Patent
Gottlieb

(10) Patent No.: US 9,719,798 B2
(45) Date of Patent: *Aug. 1, 2017

(54) CONTEXT-SENSITIVE NAVIGATIONAL AID

(71) Applicant: Inspired Possibilities, LLC, Fairfax Station, VA (US)

(72) Inventor: Mark Gottlieb, Fairfax Station, VA (US)

(73) Assignee: Inspired Possibilities, LLC, Fairfax Station, VA (US)

( * ) Notice: Subject to any disclaimer, the term of this patent is extended or adjusted under 35 U.S.C. 154(b) by 321 days.

This patent is subject to a terminal disclaimer.

(21) Appl. No.: 14/289,951

(22) Filed: May 29, 2014

(65) Prior Publication Data
US 2014/0278066 A1    Sep. 18, 2014

Related U.S. Application Data

(63) Continuation of application No. 12/081,836, filed on Apr. 22, 2008, now Pat. No. 8,755,968.

(51) Int. Cl.
*G01C 21/00* (2006.01)
*G01C 21/36* (2006.01)

(52) U.S. Cl.
CPC ..... *G01C 21/3697* (2013.01); *G01C 21/3682* (2013.01)

(58) Field of Classification Search
None
See application file for complete search history.

(56) References Cited

U.S. PATENT DOCUMENTS 8,755,968 B2 * 6/2014 Gottlieb ............. G01C 21/3682
701/36
2006/0200285 A1 * 9/2006 Obradovich ....... B60G 17/0195
701/32.3

* cited by examiner

Primary Examiner — Paul Danneman
(74) Attorney, Agent, or Firm — Davidson Berquist Jackson & Gowdey, LLP

(57) ABSTRACT

A navigational aid including an intelligent display mode and a communication system communicates with a vehicle's sensor system and/or historical- or time-based information to reduce the number of businesses that are displayed on the map by filtering out unneeded or less preferred services. When the vehicle's fuel level sensor detects that the fuel tank is almost empty, a message can be sent from the sensor system to the navigational aid such that the navigational aid can then begin showing a visual indication (e.g., text or graphical information such as an icon) of the location of fuel stations on the screen. Additionally, the location receiver indicates to the filter when the navigational aid is close to the programmed destination. At that point, the filter can be informed that it should start showing garages or areas where the vehicle can be parked without having cluttered the screen with parking garages that were not close to the destination. Similarly, when in need of other services (e.g., hotel or restaurant services), the navigational aid can display preferred brands (while omitting non-preferred brands) and make reservations when a communication system is included which is capable of communicating with the service provider. Additionally, prices or relative prices for the services may also be indicated.

23 Claims, 3 Drawing Sheets

CONTEXT-SENSITIVE NAVIGATIONAL AID

CROSS-REFERENCE TO CO-PENDING APPLICATION

This application is a continuation of U.S. patent application Ser. No. 12/081,836, filed Apr. 22, 2008, entitled "CONTEXT-SENSITIVE NAVIGATIONAL AID," the contents of which are incorporated by reference.

FIELD OF INVENTION

The present invention is directed to a navigational aid (such as a GPS system) which includes context sensitive information, and in one embodiment to a system and method for filtering out or adding information to what a user sees or hears while using a navigational aid based on time-sensitive or application-specific information.

DISCUSSION OF THE BACKGROUND

A number of companies have begun releasing navigational aids (such as GPS systems) that can be carried on one's person or transported in a vehicle to aid in going from place to place. Some of those systems identify various types of businesses that are located within the field of view of the map in case the user has need of such a service. This includes the ability to see gas stations, restaurants, etc. as one drives around. However, cluttering up a screen with gas stations is not valuable when that vehicle's gas tank is mostly full. Moreover, cluttering up a screen with restaurants is not valuable after just having stopped by a restaurant or when one is not hungry.

BRIEF DESCRIPTION OF THE DRAWINGS

The following description, given with respect to the attached drawings, may be better understood with reference to the non-limiting examples of the drawings, wherein.

DISCUSSION OF THE PREFERRED EMBODIMENTS

Figure 1:
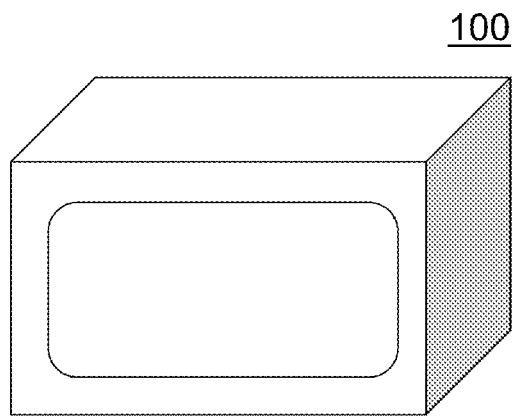
FIG. 1 is a conceptual diagram of a navigational aid (e.g., a GPS system) with a screen for showing a map of an area near the navigational aid.
Figure 2:
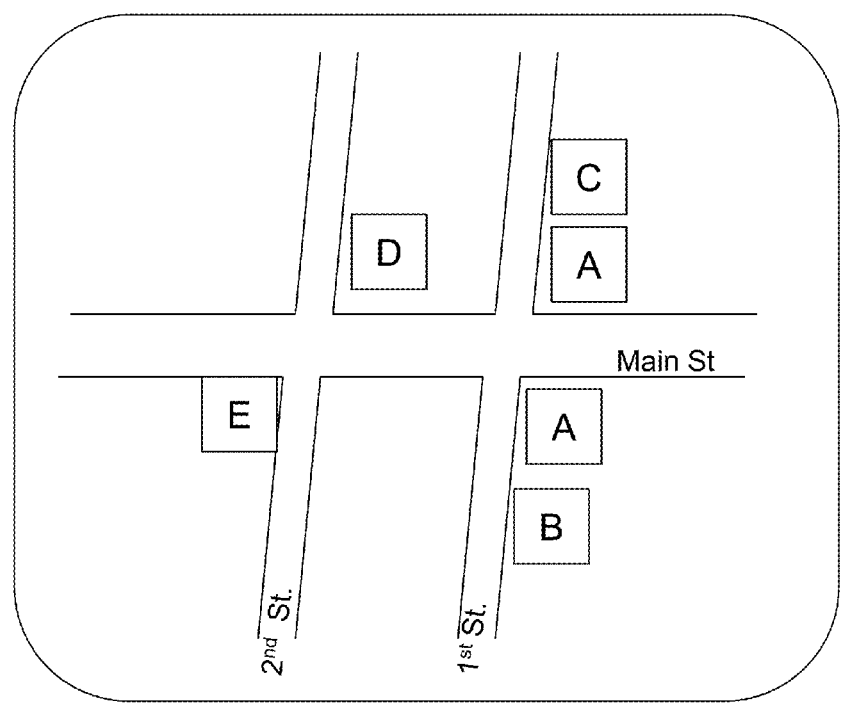
FIG. 2 is an exemplary illustration of a map showing all of the known businesses in the area near the navigational aid.
Figure 3:
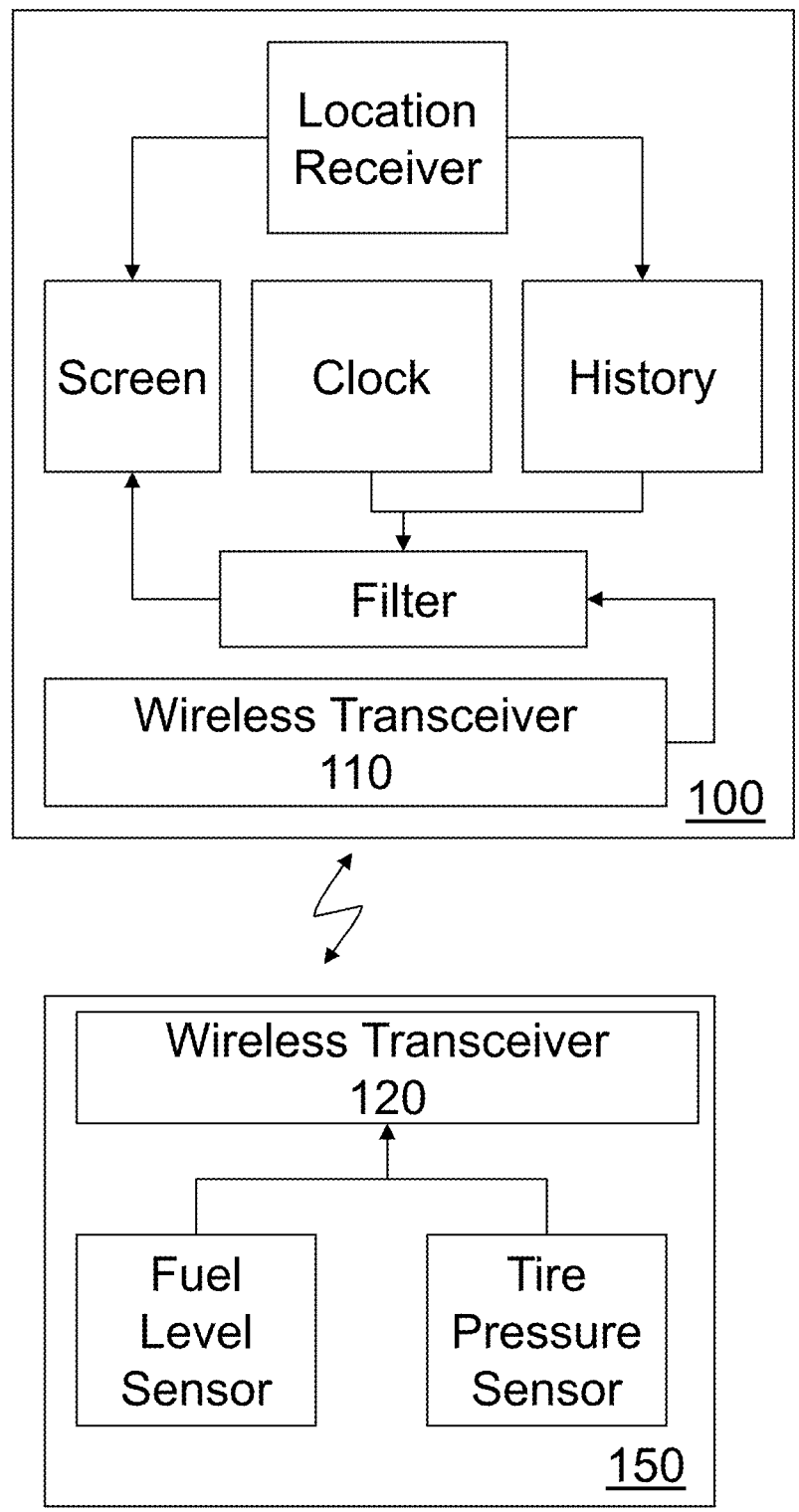
FIG. 3 is a block diagram of a navigational aid communicating with sensors in a vehicle in order to provide context sensitive information.
Figure 4A:
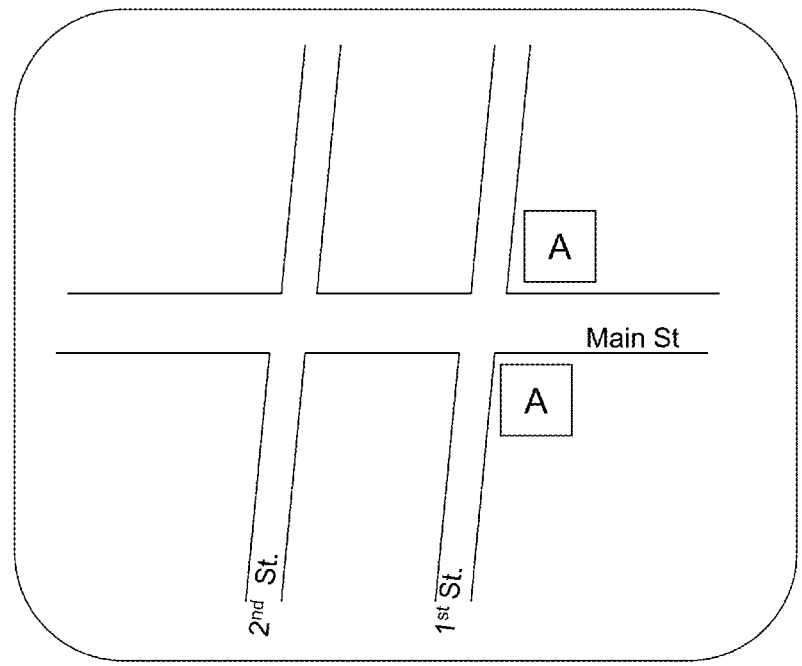
FIGS. 4A and 4B are exemplary illustrations of the map of FIG. 2 after filtering out businesses that are not relevant to a user's desired needs at the time.
Figure 4B:
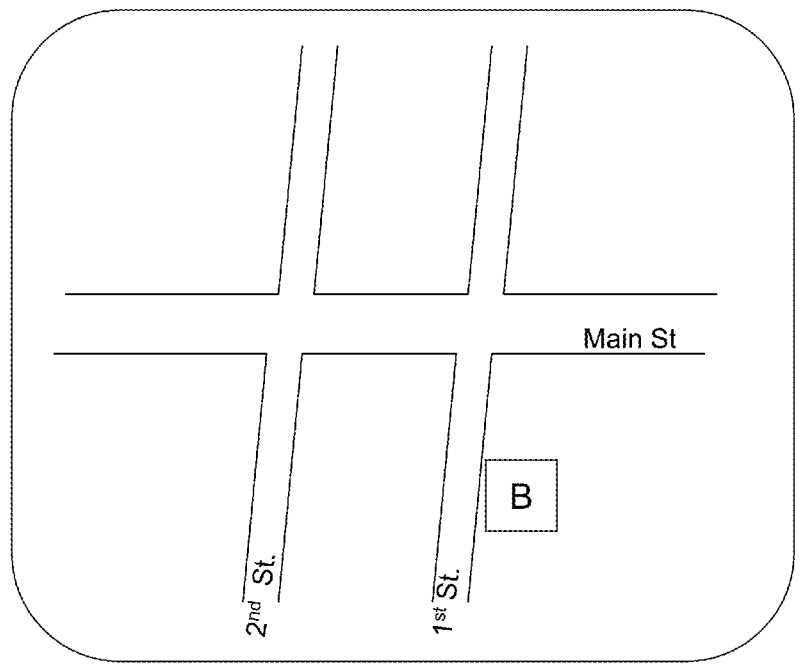

Turning to FIG. 1, a navigational aid 100 using a location receiver (e.g., a GPS receiver, a cellular triangulation unit or any other wireless signal-based triangulation unit (e.g., a WiFi-based triangulation unit)) that displays a map of the area around the navigational aid is shown. In one embodiment, the map can be moved (e.g., scrolled) to other locations other than the area around the navigational aid (e.g., to see a later part of a route or to see businesses further away). As shown in FIG. 2, the map contains information about a number of different business locations and their types. While the various business types are indicated with different letters in FIG. 2, the business types can also or alternatively be indicated by different graphical representations (e.g., icons) with the same or different colors. As shown in FIG. 2, all the business locations are indicated in a first mode (e.g., a default mode) in which filtering is not used for the display of business locations.

When a user wishes to reduce clutter on the screen, the user may switch the navigational aid 100 into an intelligent display mode (e.g., by using a switch or a touch screen sensor (not shown)). By including a communication system (e.g., a wired system (e.g., USB-based) or a wireless connection 110 such as WiFi (e.g., the 802.11 family of protocols) or BlueTooth) in the navigational aid 100 that communicates with a vehicle's sensor system 150 (either via a wired connection or wirelessly) using a corresponding transceiver 120, the navigational aid 100 can provide context sensitive information while in the intelligent display mode. For example, when the vehicle's fuel level sensor detects that the fuel tank is almost empty, a message can be sent from the sensor system 150 to the navigational aid 100 indicating the fuel level status. The filter in the navigational aid 100 can then begin showing a visual indication (e.g., text or graphical information such as an icon) of the location of fuel stations on the screen. This fuel level sensor may further be coupled back to the route calculating system so that the navigational aid 100 can determine if the vehicle can make it to a next available or preferred gas station. For example, the navigation system would dynamically be learning how much fuel is in the tank and would be able to warn a user that an upcoming fuel station is the last fuel station before the fuel will run out on the route (or before the "distance to empty" falls below some threshold). In addition, the filter may be further provided with information on the type of fuel needed for the vehicle (e.g., unleaded, diesel, compressed propane, or electric battery) such that only fuel stations selling compatible fuel are shown on the map.

In one embodiment, an audible warning may be used instead or in addition to the visual indication. The same kind of filtering can cause gas stations or tire changing businesses to appear on a map in response to a tire pressure sensor indicating that tire pressure is low (as might occur when a tire has been punctured). The same kind of filtering can cause gas stations or oil changing businesses to appear on a map in response to another sensor (e.g., a sensor detecting oil pressure, radiator fluid level, engine temperature) indicating that a vehicle condition is abnormal (e.g., when oil pressure is low, radiator fluid is low or the engine is overheating).

In addition, the information controlling the filter of the navigational aid 100 may be received from interfaces other than an interface to the sensor system 150. For example, the filter can be fed by data internal to the navigational aid 100 itself. In one embodiment, the location receiver indicates to the filter when the navigational aid 100 is close to (e.g., within a few blocks) the programmed destination. At that point, the filter can be informed that it should start showing garages or areas where the vehicle can be parked. Additional information (e.g., a home location) can indicate that parking information is not needed as the destination is really home. This would prevent the screen from being unnecessarily cluttered when public parking is not needed. In one embodiment, the navigational aid 100 would prompt the user to indicate whether public parking will be needed at the destination to avoid cluttering the screen. The user may be prompted when the destination is first entered, when the navigational aid 100 is close to the destination, or at any other time in the journey.

Similarly, the filter of the navigational aid 100 can use location history information to suggest restaurants that are similar (e.g., belong to the same chain or serve the same kind of food) as restaurants that have previously been visited while ignoring (or not displaying) non-matching restaurants. In one embodiment, the navigational aid 100 will prompt the user to specify a rating for the restaurant so that it may filter out low rated restaurants in the future.

Furthermore, in another embodiment, when the navigational aid 100 is requested to show a service type (e.g., restaurants or hotels), it would show the businesses of that service type that are in the field of view of the screen along with a list of favorite businesses of that service type that are coming up within a threshold period of time (e.g., 45 minutes in a trip that still has hours remaining). For example, while driving from Washington DC to New York, a user selects to be shown restaurants/hotels and begins to see on a main screen those restaurants/hotels that are on the viewable portion of the map. In addition, a sub-screen shows historical restaurant/hotel favorites that are coming up within the next 45 minutes. In this way, although a favorite restaurant/hotel is not any of the 5 restaurants/hotels within the 10-mile view on the main map, the sub-screen display would nonetheless indicate that a favorite (e.g., Panera or Starbucks for restaurants or Marriott for hotels) is relatively close (e.g., 12 miles ahead). As used herein, "hotel" shall be understood to mean any kind of consumer oriented lodging such as hotels, motels, lodges, inns, etc.

Additionally, preference information based on historical information can be used to further filter out businesses that are not preferred businesses. For example, when selecting which fuel stations to show in response to a fuel level indication, the navigational aid 100 can filter out all fuel stations that do not match the brand of fuel station that has been predominantly used in recent visits. In one embodiment, the filter shows only the fuel stations that are the same brand as the fuel station that has been used more than 75% of the time in the last "x" times, where "x" is an integer that can be specified as a threshold, such as 10. In this way, the navigational aid 100 learns a user's habits. The same learning process can be used for all other types of services (e.g., hotels and restaurants).

In an embodiment where the navigational aid 100 can receive real-time price information, businesses (e.g., gas stations, parking garages/lots, hotels) can also be sorted by price when a particular type of service is needed. In one embodiment, the prices are sorted in a sub-screen showing the price and the name (and/or location) of the business. In another embodiment, the sorted prices are indicated by the intensity and/or color of the icon or text representing the business. For example, the best price may be indicated with the brightest color and the worst price with the darkest color. Alternatively, the best price may be indicated with a color at one end of the color spectrum (e.g., red) and the worst price with a color at the opposite end of the color spectrum (e.g., violet). In yet another embodiment, the price or the icon or text representing the business can be made to blink at a rate indicating how favorable the price is. For example, a fast blinking price may be the most favorable and a slow blinking price may be the least favorable. Alternatively, a visual indicator can even show the actual prices.

In such embodiments, prices can be downloaded using "interactive information systems." As used herein, that phrase includes, but is not limited to, an AM sub-carrier, an FM sub-carrier, DECT cordless phone technology, GSM, GPRS, Wi-Fi, WiMax, ZigBee, and 3G/4G telephone technology. Any of those communication protocols can use free communications, pay-per-use communications and/or a monthly subscription option. While Wi-Fi or WiMax may not be the method of choice while the vehicle is moving, connections can be made when the vehicle is stopped or parked—even if those connections are simply made in the owner's garage at home or the office. Most information does not need to be updated more than once a day. For example, prices can be downloaded over a Wi-Fi or Wi-Max connection for those service providers along the route planned out by the navigational aid 100 before leaving a home or office by querying information services (e.g., web sites) associated with the service providers.

In addition, information can be forwarded between various communications methods/protocols. For example, information received via cell phone can in turn be communicated to the navigational aid 100 with another short-range wireless protocol (e.g., Bluetooth).

In addition to the filter using the historical location information to determine restaurants and fuel stations, the filter can learn preferred locations for any other product or service. For example, the system would be able to learn over time which bank is used by the user so that banks other than the preferred brand would not be shown (or would be shown differently (e.g., greyed out)) when requesting bank locations. (The filter can be overridden to show other banks upon request (e.g., by touching the screen at a bank location that is greyed out). Furthermore, the filter may receive clock/time information so that it may filter out (or display differently) preferred banks that are closed and/or do not have ATMs. The navigational aid 100 could receive the information on the business' hours using the "interactive information systems" described above.

In a further embodiment of a navigational aid 100, each of several users that use the navigational aid 100 identify themselves to the navigational aid 100 when they begin to use it so that different sets of favorites can be stored and recalled as needed. Many vehicles use this knowledge of which person is driving to set the seat, mirror controls and radio pre-sets. This same process could extend to the information that is displayed on the navigation system—and even the format of display. For example, the display could even choose different 'skins' for selecting how information is formatted on the display and/or how the navigational aid 100 responds to various commands.

As data and communication of such data to and from moving vehicles becomes more the norm—one has the ability to check availability, pricing and place orders with services that are up coming on one's journey. For example, when one is looking for a hotel to stop at for the night, the navigational aid 100 can display not only which motels are upcoming and the availability of rooms, but a service could even work out deals as one drives that result in offers for services/products being displayed that are available for some short period of time (e.g., within an upcoming half hour). For example, the navigational aid 100 could present a special offer available at the Best Western Motel (e.g., ahead 12 miles—$69 per night) if accepted by checking in within the next 45 minutes. Motels and hotels could offer these last minute specials in the evening as they see their occupancy rate is not where they would like it.

The same kind of offer can be provided in an auction or bid basis. In such a system, all services of a certain kind (e.g., motels) on an existing route are notified that the corresponding service is needed in the near future (e.g., a hotel is needed for the current night). This notification may come from the navigational aid 100 directly or the navigational aid 100 can contact a service consolidator that passes on the notification (and receives results). The services would know how far away the navigational aid 100 is (and thus an estimated time of arrival (ETA)). Those services can then make offers based on their availability and odds of filling the space if they do not accept a particular reservation. The services would then bargain (or bid) to provide the service at an announced rate (either returning the rate(s) directly to the navigational aid 100 or returning the rate(s) to the service consolidator which communicates them to the navigational aid 100). The navigational aid 100 would display the offers (or just the best of the offers), and the user could accept the service at one of the listed prices or decline and keep driving.

In an alternate embodiment, if the navigational aid 100 indicates that the user wishes to accept the service, then the service provider may contact the user for any additional information (e.g., confirmation of any details not stored in a user's profile (if a profile is used) or any information needed to hold the reservation if a profile is not used or communicated to the service provider). During the communication with the service provider, the user may provide details such as a pass code or a credit card number. The communication may be either through the navigational aid 100 (e.g., connected using the Bluetooth connection to the user's cell phone or using any other internal communications interface). Alternatively, the service provider may call back the user's cell phone number.

If an offer was to be accepted, the navigational aid 100 would reset the destination to the location to provide the service so that the offer could be accepted within the specified period of time. Alternatively, the navigational aid 100 could include enough personal information to accept offer and hold the reservation (e.g., using a credit card number). Other data such as how many people or how many rooms are needed could be entered while still driving. Personal preferences such as smoking or non-smoking information could be stored in a personal profile (either in the navigational aid 100 or at the service consolidator). Even frequent stay programs and payment information could be transferred ahead.

A further example of this prearrangement of services (e.g., using bids, auctions or original prices) can likewise be used by restaurants along a route. The service could also include reserving a table for a family of a selected size at a restaurant while driving to it.

In an alternate embodiment, the navigational aid 100 is not mounted in a vehicle but is instead carried on the person of a user (e.g., in a PDA, a Cell Phone or a walkie-talkie) without departing from the scope of the above teachings.

While certain configurations of structures have been illustrated for the purposes of presenting the basic structures of the present invention, one of ordinary skill in the art will appreciate that other variations are possible which would still fall within the scope of the appended claims.

The invention claimed is:

1. A navigational aid, comprising:
a location receiver for receiving a current location; and
a context-sensitive filter for selecting which businesses stored in a database of locations of businesses of interest and located in locations shown on a map are displayed on the map and which businesses stored in the database and located in locations shown on the map are not displayed, wherein the context sensitive filter receives a distance from the current location to a destination on the map selected by a user and selectively causes businesses to be displayed on the map such that businesses displayed on the map comprise businesses of a selected type when the distance from the current location to the destination is below a threshold and businesses not displayed on the map comprise businesses of the selected type when the distance from the current location to the destination is above the threshold.

2. The navigational aid as claimed in claim 1, wherein the navigational aid is integrated into a cellular phone.

3. The navigational aid as claimed in claim 1, wherein the navigational aid is integrated into a personal digital assistant.

4. The navigational aid as claimed in claim 1, wherein the navigational aid is mounted in a vehicle.

5. The navigational aid as claimed in claim 1, wherein the location receiver receives GPS coordinates.

6. The navigational aid as claimed in claim 1, wherein the location receiver comprises a wireless signal-based triangulation unit.

7. The navigational aid as claimed in claim 1, further comprising a wireless receiver for information from a sensor of a vehicle.

8. The navigational aid as claimed in claim 7, wherein the wireless receiver receives a fuel level status of a vehicle, wherein the context sensitive filter causes businesses to be selectively displayed such that businesses displayed on the map comprise fuel stations when the fuel level status of the vehicle is below a threshold and businesses not displayed on the map comprise fuel stations when the fuel level status of the vehicle is above the threshold.

9. The navigational aid as claimed in claim 8, wherein the context sensitive filter comprises an interface for receiving historical location information indicating a preferred type of fuel station, wherein the fuel stations displayed on the map are fuel stations of the preferred brand when the fuel level status of the vehicle is below the threshold and fuel stations not displayed on the map are fuel stations not of the preferred brand when the fuel level status of the vehicle is below the threshold.

10. The navigational aid as claimed in claim 7, wherein the wireless receiver comprises a WiFi transceiver.

11. The navigational aid as claimed in claim 7, wherein the wireless receiver comprises a WiMax transceiver.

12. The navigational aid as claimed in claim 7, wherein the wireless receiver comprises a BlueTooth transceiver for communicating with a cellular phone in the vehicle.

13. The navigational aid as claimed in claim 7, wherein the wireless receiver receives an indication of an abnormal status in a vehicle, wherein the context sensitive filter causes businesses to be selectively displayed such that businesses displayed on the map comprise businesses that can correct the abnormal status when the abnormal status is detected and businesses not displayed on the map comprise businesses that can correct the abnormal status when the abnormal status is not detected.

14. The navigational aid as claimed in claim 13, wherein the abnormal status is at least one of a low oil pressure, a low radiator fluid level and a high engine temperature.

15. The navigational aid as claimed in claim 1, wherein the businesses of the selected type comprise parking locations.

16. The navigational aid as claimed in claim 15, wherein the context sensitive filter further causes an indication of price of the displayed parking locations to be displayed.

17. The navigational aid as claimed in claim 1, wherein the context sensitive filter receives rating information, wherein the context sensitive filter causes businesses to be selectively displayed such that businesses displayed on the map comprise businesses having a rating at least as high as a threshold and businesses not displayed on the map comprise businesses having a rating lower than the threshold.

18. The navigational aid as claimed in claim 1, further comprising a receiver for receiving an indication of which user is using the navigational aid,
    wherein the context sensitive filter receives historical location information specific to the user,
    wherein the context sensitive filter causes businesses to be selectively displayed such that businesses displayed on the map comprise businesses of the same brand as were stopped at previously by the user and businesses not displayed on the map comprise businesses not of the same brand as were stopped at previously by the user.

19. The navigational aid as claimed in claim 1, further comprising a wireless receiver for wirelessly receiving information relating to costs of services provided by businesses of interest stored in the database.

20. The navigational aid as claimed in claim 19, wherein the wireless receiver comprises at least one of an AM receiver, an FM receiver, a cordless phone receiver, a GSM receiver, a GPRS receiver, a WiFi receiver, a WiMax receiver, a ZigBee receiver, a 3G receiver and a 4G receiver.

21. A navigational aid comprising:
    a location receiver for receiving a current location; and
    a context sensitive filter receiving historical location information and for selecting which businesses stored in a database of locations of businesses of interest and located in locations shown on a map are displayed on the map and which businesses stored in the database and located in locations shown on the map are not displayed, wherein the context sensitive filter selectively causes businesses to be displayed on the map such that businesses displayed on the map comprise businesses of the same brand as were stopped at previously that are near the current location and businesses not displayed on the map comprise businesses near the current location that are not of the same brand as were stopped at previously.

22. The navigational aid as claimed in claim 21, wherein the businesses are at least one of a restaurant, a fuel station, a bank and a hotel.

23. A navigational aid comprising:
    a location receiver for receiving a current location; and
    a context-sensitive filter for selectively displaying on a map businesses of a selected service type stored in a database of locations of businesses of interest and located in locations shown on the map, wherein the context sensitive filter receives a distance from the current location to at least one preferred brand of business of the selected service type and displays the distance from the current location to the at least one preferred brand of business of the selected service type in addition to businesses of the selected service type located in locations shown on the map, even though the at least one preferred brand of business of the selected service type is not shown on the map.

* * * * *